United States Patent [19]

Laesser

[11] 4,423,928

[45] Jan. 3, 1984

[54] LIQUID CRYSTAL DISPLAY DEVICE

[75] Inventor: Claude Laesser, La Chaux de Fonds, Switzerland

[73] Assignee: Ebauches, S.A., Switzerland

[21] Appl. No.: 212,353

[22] Filed: Dec. 3, 1980

[30] Foreign Application Priority Data

Dec. 11, 1979 [CH] Switzerland ............... 10962/79

[51] Int. Cl.³ .................................................. G02F 1/13
[52] U.S. Cl. ..................................... 350/335; 350/338
[58] Field of Search .................. 350/335, 334, 337–338, 350/385, 388; 340/765, 784; 368/242

[56] References Cited

U.S. PATENT DOCUMENTS

| 3,903,519 | 9/1975 | Zega. | |
| 4,054,368 | 10/1977 | Krueger et al. | 350/335 |
| 4,099,855 | 7/1978 | Wisbey et al. | 350/335 |
| 4,231,639 | 11/1980 | Banda | 350/335 |
| 4,240,709 | 12/1980 | Hörnell | 350/335 |

FOREIGN PATENT DOCUMENTS

| 2206884 | 6/1974 | France. | |
| 2238200 | 2/1975 | France. | |
| 54-4155 | 1/1979 | Japan | 340/784 |
| 592316 | 10/1977 | Switzerland. | |
| 1469638 | 7/1974 | United Kingdom. | |
| 1502783 | 3/1978 | United Kingdom. | |
| 2032640A | 7/1979 | United Kingdom. | |

OTHER PUBLICATIONS

Scheffer et al., "Optimum Polarizer Combinations for Twisted Nematic Displays" Conf. Paper, pp. 53–60.
Goscianski, M., "Optical Characteristics of Twisted Nematic Liquid Crystals Application to the Improvement of the Scanning Capability in Matrix Displays", Jr. of App. Physics, 4–1977, pp. 1426–1431.
Dir, G. A. "Varible Neutral Density Device", Xerox Disc. Jr. 6–1976, pp. 79–80.

Primary Examiner—William H. Punter
Attorney, Agent, or Firm—Allegretti, Newitt, Witcoff & McAndrews, Ltd.

[57] ABSTRACT

The display device comprises a cell having two levels, between two polarizers 1 and 7, the directions of polarization of which are at an angle of 120° to each other. The two-level cell comprises two liquid crystal layers 5 and 6, each of which, in the rest condition, causes rotation of the plane of polarization of the light through 60°. The orientation of the molecules of the input surface of the first layer 5 is parallel to the direction of polarization P1 of the first polarizer 1. The orientation of the molecules of the input surface of the second layer 6 is parallel to the orientation of the molecules on the output face of the first layer 5. The orientation of the molecules of the output surface of the second layer 6 is parallel to the direction of polarization P2 of the second polarizer 7.

This construction provides a two-level cell which is clear if the two liquid crystal layers are both in the rest condition, and which is dark in all other situations, whether one or the other or both layers 5, 6 are energized.

2 Claims, 2 Drawing Figures

LIQUID CRYSTAL DISPLAY DEVICE

BACKGROUND OF THE INVENTION

The present invention relates to a liquid crystal display device employing two nematic liquid crystal layers in a sandwich structure, each which associated control electrodes. Such a two layer device makes it possible to increase the number of characters, signs or symbols which can be displayed by a cell of given surface area.

Such a cell is advantageously used in electronic watches which, by virtue of progress in the integrated circuit art, are provided with an increasing number of auxiliary functions which may or may not be linked to measuring time. These functions often require the display of characters, signs or symbols, the number and the complexity of which exceed the capabilities of conventional display devices, the useful surface area of which is limited by the usual dimensions of a clock or watch.

In order to solve this problem, it is possible to envisage disposing two conventional liquid crystal cells of the twisted nematic type one above the other, in each of which the plane of polarization of the light passing there through rotates through 90° when they are not energized. Therefore, the plane of polarization rotates through a total angle of 180° and, in order for the double cell to be clear when it is in the rest condition, the polarizer disposed on respective sides of the cell must have parallel polarization directions. When either cell is energized, the energized regions will appear dark but, in any regions in which the two cells are simultaneously energized the device will be clear and have the same appearance as the regions in which neither of the cells is energized.

This is a major disadvantage since, if a character is to be formed by simultaneous energization of one or more display elements of one cell and one or more display elements of the other cell, the places at which the elements overlap each other are clear, like the non-energized regions of the cell. For example, if a cross is displayed by energizing a straight element of one cell and a straight element of the second cell, the point at which the two straight elements intersect is clear and the display is not a cross but a cross which has no center.

BRIEF SUMMARY OF THE INVENTION

One object of the present invention is to overcome this drawback by providing a display cell comprising three insulating and transparent plates, namely a front, an intermediate and a back plate, two liquid crystal layers disposed respectively between the front and the intermediate plate and between the intermediate and the back plate, and two polarizers respectively located near the outside faces of the front and back plates with their directions of polarization forming an angle of about 90° to 150° with each other. The molecules of liquid crystal which are in contact with the front and back plates are oriented, when no electrical field is applied, by alignment layers, in directions substantially parallel with the directions of polarization of the adjacent polarizer. The molecules of liquid crystal which are in contact with both sides of the intermediate plate are likewise oriented, when no electrical field is applied, by alignment layers, in a direction forming with each of the directions of polarization an angle substantially equal to the half of the angle formed by the directions of polarizations of the two polarizers.

In such a cell, a character, a sign or a symbol exhibits practically the same contrast when it is formed by the energization of one, or the other, or both liquid crystal layers.

DETAILED DESCRIPTION OF A PREFERRED EMBODIMENT

Figure 1:
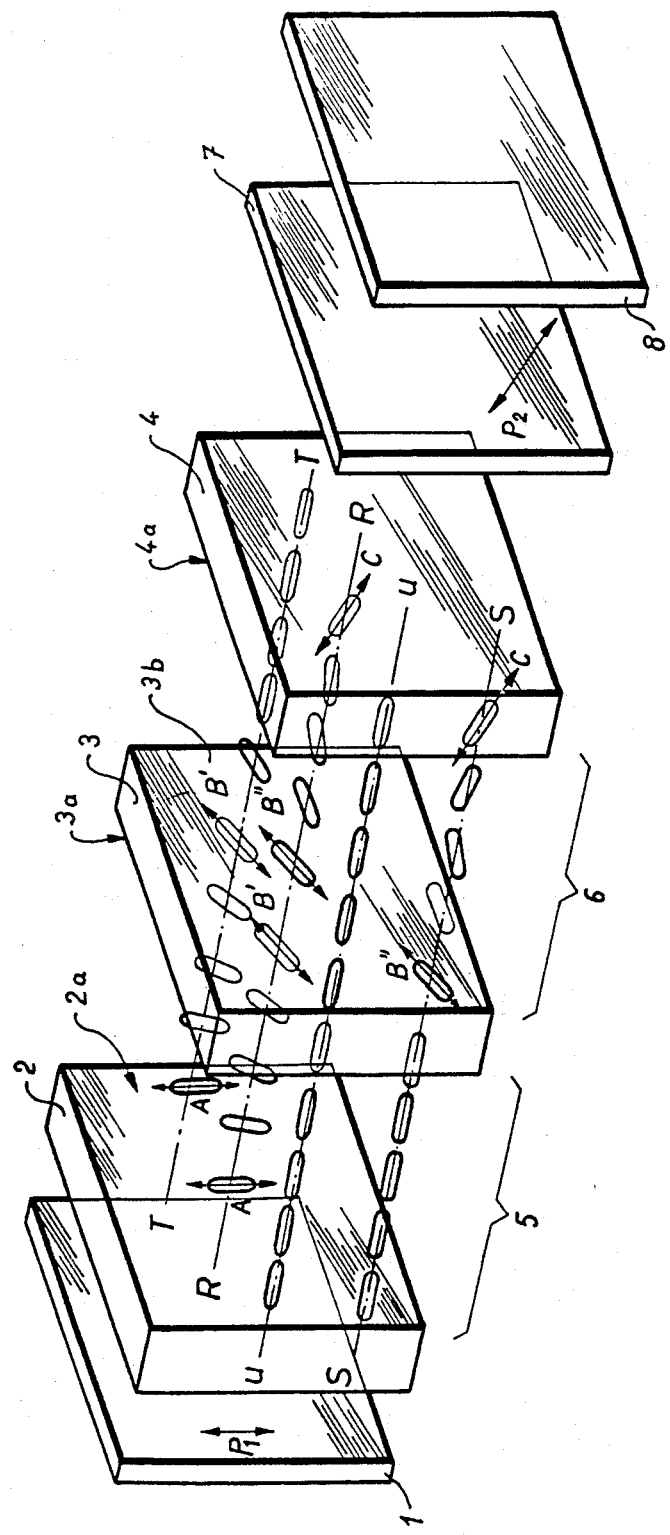
FIG. 1 of the accompanying drawings is a diagrammatic view of the construction and the operating principle of an illustrative display cell according to the invention.

The cell comprises a first polarizer 1 having a polarization direction P1, and three glass plates 2, 3 and 4 which are separated by nematic liquid crystal layers 5 and 6. The molecules of the liquid crystal are shown in FIG. 1 in highly diagrammatic form, along four axes R-R, S-S, T-T and U-U illustrating each one of the four modes of operation of the cell, as will be described hereinafter.

A second polarizer 7 having a polarization direction P2 which is at an angle of 120° to the polarization direction P1 is placed to the rear of the cell, in front of a reflector 8.

Figure 2:
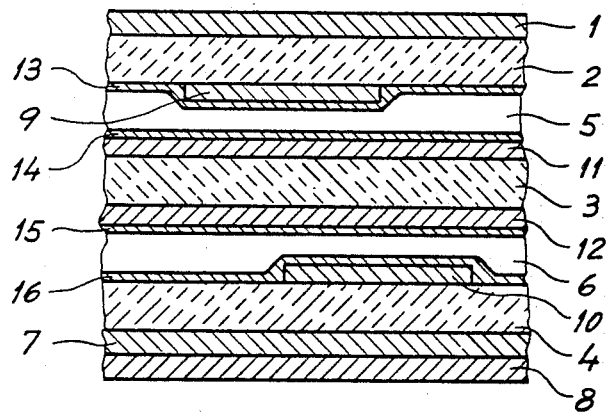
FIG. 2 is a diagrammatic sectional view of the cell of FIG. 1.

In a manner well known to those skilled in the art, transparent control electrodes, examples of which are shown at 9 and 10, respectively, in FIG. 2 are disposed on the internal faces 2a and 4a respectively of the plates 2 and 4, and counter-electrodes 11 and 12 which are also transparent, are respectively disposed on the two faces 3a and 3b of the intermediate plate 3. The control electrodes such as 9 and 10 are in the shape of the elements, the combinations of which make it possible to display the desired characters.

The internal face 2a of the plate 2 also carries an alignment layer of a known type shown at 13 in FIG. 2 for the molecules of the liquid crystal which are in contact therewith. The alignment layer 13 is such that, in the absence of an electrical field, the molecules line up in a direction A which is substantially parallel to the surface 2a and to the polarization direction P1 of the polarizer 1.

The faces 3a and 3b of the plate 3 also each carry an alignment layer 14 and 15 respectively, which is such that in the absence of an electrical field, the liquid crystal molecules in contact with these faces are in directions B' and B" that are substantially parallel to each other and to the plate 3 and which are at an angle of 60° to direction A. These directions B' and B" will be simply referred to hereinafter as direction B.

Finally, the face 4a of the plate 4 also carries a layer 13 which, in the absence of an electrical field, aligns the liquid crystal molecules which are in contact therewith in a direction C which is substantially parallel to the plate 4 and which is at an angle of 60° to the direction B. The direction C therefore is at an angle of 120° to direction A and is parallel to the polarization direction P2 of the polarizer 2.

The above mentioned angles are all in the same sense, that is to say, if the cell is viewed in plan from the side of the polarizer 1, the angles all result from positive rotation starting from direction P1 which is taken arbitrarily as the 0° direction, or they all have a negative rotation from the same direction P1. It is also clearly apparent that each of the angles may be increased or reduced by an integral multiple of 180°.

The plates 2, 3 and 4 are joined together in a known manner by sealed spacers (not shown) which determine the thickness of the layers 5 and 6 and which maintain the liquid crystal between the plates. It will be appreciated that suitable means as are known in the art (not shown) interconnect and fix together the various components of the cell.

The cell may operate in accordance with four different modes which will be described hereinafter:

MODE 1

In the regions of the cell which are in the rest condition, that is to say, in regions corresponding to the background areas of the display and to the display elements which are not visible, as for example in the region of the axis R-R in the drawing, neither of the liquid crystal layers is energized by an electrical field. In each of the layers 5 and 6, the liquid crystal molecules take up a helical structure, with the directions of the molecules progressively rotating through 60° between the plates which delimit the above-mentioned layers, while remaining parallel to the plates.

The light which reaches the plate 2 after having passed through the polarizer 1 has a polarization plane parallel to the direction P1. When the light passes through the layer 5, the polarization plane turns through 60° and becomes parallel to direction B. When the light passes through the layer 6, the plane of polarization rotates through another 60° and becomes parallel to direction C and therefore to direction P2. The light therefore can pass through the second polarizer 7 and reach the reflector 8 which reflects it without modifying the direction of its plane of polarization. It therefore successively passes again through the polarizer 7 and the layers 6 and 5, where its plane of polarization again rotates each time through 60°, in the opposite direction to its previous rotation.

This light therefore again can pass through the polarizer 1 as its polarization plane is again parallel to direction P1. If the intensity of the light passing into the cell is denoted $I_o$ and assuming that the polarizer 1 and 7, the plates 2, 3 and 4, the liquid crystal between those plates and the reflector 8 are perfect, that is to say, that they do not cause any additional absorption, the intensity $I_{R1}$ of the light which re-issues from the cell under the above-described conditions is given by:

$$I_{R1} = 0.5 \times I_o$$

This value is exactly the same as the value of the intensity of the light which re-issues from a conventional cell having a single liquid crystal layer, in its rest condition. The factor 0.5 is due solely to the absorption by the polarizer 1 of all the components of the incident light $I_o$ which have a polarization plane perpendicular to the direction P1.

The cell therefore appears clear in the regions such as that of the axis R-R, for an observer who is situated at the side of the polarizer 1. These regions correspond to the background of the display and to the display elements which are not visible.

In practice, the intensity $I_{R1}$ of the light reflected by a cell embodying the invention is only equal to $0.2 \times I_o$. This is due to the fact that the polarizers 1 and 7 allow only approximately 80% of the light polarized parallel to their direction of polarization, to pass. Again, this is exactly the same as with conventional cells which have a single liquid crystal layer.

MODE 2

In other regions of the cell, such as the region disposed along the line S-S in the drawing, a display element is to be made visible, and the liquid crystal layer 5 is energized by an electrical field perpendicular to the plates 2 and 3, which is produced by a voltage applied between one of the electrodes carried by the plate 2 and the counter-electrode carried by the face 3a of the plate 3, whereas the layer 6 is not subjected to such a field.

The liquid crystal molecules of the layer 5, which are disposed in the above-indicated region, are oriented parallel to the electrical field and therefore occupy a direction perpendicular to the plates 2 and 3. They no longer have any effect on the direction of the plane of polarization of the light which reaches them after having passed through the polarizer 1. This polarization plane which is parallel to direction P1 therefore is at an angle of 60° to the direction B of the liquid crystal molecules in contact with the face 3b of the plate 3. The light which under these conditions arrives at the above-mentioned liquid crystal molecules can be considered as being composed of two components D1 and D2, the first component, D1, having its plane of polarization parallel to direction B while the other, D2, has its plane of polarization perpendicular to direction B.

In the layer 6, the plane of polarization of the two components D1 and D2 undergoes rotation through 60°. The component D2 therefore has its plane of polarization perpendicular to direction P2 when it reaches the polarizer 7. The latter therefore absorbs it completely. On the other hand, the component D1 passes through the polarizer 7 as its plane of polarization is parallel to direction P2.

The component D1 therefore reaches the reflector 8 which reflects it without modifying the direction of its plane of polarization. It passes back through the polarizer 7, the layer 6 in which its plane of polarization is again rotated through 60° in the opposite direction to the previous rotation, and the layer 5 in which the direction of its plane of polarization does not change. This plane of polarization therefore is at an angle of 60° to the direction P1 when the component D1 reaches the polarizer 1.

The component D1 may again be resolved into two components, one component D11 having its plane of polarization parallel to the direction P1 and the other component D12 having its plane of polarization perpendicular to the direction P1. The component D12 is absorbed by the polarizer 1 whereas the component D11 passes through it and issues from the cell.

In order to determine the intensity of the light which issues from the cell under the above described condition, each state in its path must be considered separately.

After the polarizing means 1, the light intensity is equal to $0.5 \times I_o$, wherein $I_o$ is the intensity of the incident light, as has been shown above.

If it again is assumed that all the elements of the cell are perfect and do not suffer from any parasitic absorption, the intensity of the light which has passed through the polarizer 1 does not vary until that light reaches the layer 6.

The intensity $I_{D1}$ of the component D1 of that light, the plane of polarization of which is parallel to direction B, is given by:

$$I_{D1} = 0.5 \times I_o \times \cos^2 60° = 0.125 \, I_o.$$

It should be noted that it is not necessary to calculate the intensity of the component D2 of the light, the plane of polarization of which is perpendicular to direction B, as the component D2 is absorbed by the polarizer 7 after having passed through the layer 6, as has been shown above.

The component D1 passes through the layer 6 and the polarizer 7 without reduction in its intensity. After reflection at the reflector 8, the component D1 again passes through the polarizer 7 and the two layers 6 and 5, and again reaches the polarizer 1 without a reduction in its intensity. The plane of polarization thereof is then also at an angle of 60° to direction P1. The component D11 of that light, the plane of polarization of which is parallel to direction P1 and forms the light which issues again from the cell, is therefore of an intensity $I_{D11}$, which is given by:

$$I_{D11} = I_{D1} \cdot \cos^2 60° = 0.5 I_o \cdot \cos^4 60° = 0.03 I_o.$$

The above indicated intensity $I_{D11}$ represents only 3% of the intensity $I_o$ of the light which enters the cell. The cell is therefore dark in the regions such as those of the line S-S, for an observer who is positioned at the polarizer 1 side.

The contrast K between the dark and the clear regions, which is an important characteristic of display cells, is given generally by:

$$K = (I_{R1} - I_{R2})/I_{R1}$$

wherein $I_{R1}$ is the intensity of the light which re-emerges from the cell in the clear regions, and $I_{R2}$ is the intensity of the light which re-emerges from the cell in the dark regions, which in the present case is equal to $I_{D11}$. In this mode of operation, the cell therefore has a contrast:

$$K = (0.5 I_o - 0.03 I_o)/0.5 I_o = 0.94.$$

By way of comparison, the theoretical contrast afforded by a conventional cell having a single liquid crystal layer is equal to unity as the light intensity $I_{R2}$ is zero.

In practice, in the cell described the intensity $I_{D11}$ is equal to $1.2 \cdot 10^{-2} \times I_o$. However, as the light intensity $I_{R1}$ is equal only to $0.2 \times I_o$, the contrast K is still equal to 0.94. In a conventional cell, $I_{R2}$ is actually equal to $1.6 \cdot 10^{-3} \times I_o$, and the contrast is 0.99. Therefore, the cell embodying the invention provides a slightly weaker contrast than a conventional cell, but this difference is imperceptible.

MODE 3

In the regions of the cell such as the region disposed along the line T-T in the drawing, where another display element is to be made visible, the liquid crystal molecules disposed in the layer 5 are not subjected to an electrical field. They therefore assume a helical structure, with the directions of the molecules progressively turning through 60° between the plates 2 and 3, while remaining parallel to the plates. In the layer 6, the liquid crystal molecules are subjected to an electrical field perpendicular to the plates 3 and 4 produced by the application of a voltage between an electrode carried by the face 4a of the plate 4 and the counter-electrode carried by the face 3b of the plate 3. These molecules therefore take up a direction which is also perpendicular to the plates 3 and 4.

The plane of polarization of the light which has passed through the polarizer 1 in that region therefore rotates through 60° when that light passes through the layer 5, but it is no more rotated until the light reaches the polarizer 7. This plane of polarization is therefore at an angle of 60° to direction P2.

As above, this light may be considered as being formed by two components, one component D3 having its plane of polarization parallel to the direction P2 and therefore passing through the polarizer 7, and the other component D4 having its plane of polarization perpendicular to direction P2 and therefore being absorbed by the polarizer 7.

The component D3 is reflected by the reflector 8 and passes back through the polarizer 7 and the layer 6 without any change in the direction of its plane of polarization. The direction of its plane of polarization is therefore at an angle of 60° to the direction B of the liquid crystal molecules of the layer 5, which are in contact with the plate 3.

The two components D31 and D32 of D3 should again be considered, these components having their planes of polarization respectively parallel and perpendicular to direction B. The two components D31 and D32 pass through the layer 5 in which their plane of polarization is again rotated through 60°. This means that the plane of polarization of the component D32 is perpendicular to the direction P1 when the light reaches the polarizer 1, and the component D32 is absorbed by the polarizer 1. On the other hand, the plane of polarization of the component D31 is parallel to the direction P1 and the component D31 issues again from the cell. Its light intensity $I_{D31}$ is equal to the light intensity $I_{D11}$ which re-issues from the cell in the second operating mode described above, as can be easily verified. The cell is therefore also dark in the regions such as that of the line T-T, and the contrast between the dark and clear regions of the cell is the same as in the second operating mode.

MODE 4

In the regions of the cell such as the region which is disposed along the line U-U in the drawing, in which a character is to be displayed by the combination of two display elements, an electrical field perpendicular to the plates 2, 3 and 4 is produced simultaneously in the two liquid crystal layers 5 and 6 by the application of voltages between electrodes disposed respectively on the plates 2 and 4, and the counter-electrodes disposed on the two faces of the plate 3. Therefore, the liquid crystal molecules in both of the layers 5 and 6 are oriented in directions perpendicular to the plates 2, 3 and 4.

The plane of polarization of the light which passes through the above-indicated region is therefore not influenced, and it is at an angle of 120° to the direction P2 when that light reaches the polarizer 7.

The component D5 of that light, the plane of polarization of which is parallel to the direction P2, passes through the polarizer 7 whereas the component D6, the plane of polarization of which is perpendicular to the direction P2, is absorbed by the polarizer 7. The component D5 is therefore reflected by the reflector 8 and passes back through the polarizer 7 and the two liquid crystal layers 6 and 5 without a change in the direction of its plane of polarization.

When that light again reaches the polarizer 1, its plane of polarization is therefore at an angle of 120° to direction P1. Again, only the component D51, the plane of polarization of which is parallel to direction P1, can pass through the polarizer 1 and re-issue from the cell, while the component D52 of which the plane of polarization is perpendicular to direction P1 is absorbed by the polarizer 1.

It is easy to show that the light intensity $I_{D51}$ of the component D51 is given by:

$$I_{D51} = 0.5 I_o \times \cos^4 120°$$

The light intensity $I_{D51}$ is therefore equal to the calculated light intensity $I_{D11}$ in the second operating mode, since $\cos 120° = -\cos 60°$, and the contrast afforded by the regions such as those on line U-U is also equal to the contrast provided by the regions such as that of the line S-S.

In summary, the above-described cell has a clear appearance when neither of the liquid crystal layers 5 and 6 is energized and a dark appearance when one or other or both liquid crystal layers are energized.

In all three cases, the dark appearance is due to the successive absorption by each polarizer of that component of the light which reaches it, which has its plane of polarization perpendicular to the direction of polarization of the polarizer. The total degree of absorption is identical in all three cases and the contrast between the dark parts and the clear parts of the cell therefore also is identical.

This cell therefore gives a very high degree of freedom in regard to selection of the characters or configurations to be displayed, which can be controlled by electrodes disposed on one or other of the plates, or by a combination of electrodes of which some are disposed on one plate and others are disposed on the other plate.

The value of 60° which is selected in the above-described example, for the angles formed by the directions A, B and C, of the angle formed by the directions P1 and P2, is an optimum value, for which the difference in contrast between, on the one hand, the second and third operating modes and, on the other hand, the fourth operating mode, is zero. It is possible, however, to depart from that optimum value and to use values of from about 45° to about 75° for the two angles formed by the directions A, B and C, without the difference in contrast which then occurs between the different operating modes becoming troublesome.

It is also unnecessary for the directions B' and B" of the liquid crystal molecules which are in contact with the two faces of the plate 3 to be strictly parallel.

The angle formed by the directions P1 and P2 may simply be selected to be substantially equal to the sum of those two angles formed by the directions A, B and C.

This freedom of choice for the different angles greatly simplifies manufacture of the cell according to the invention, and reduces its cost price.

It will be apparent that the cell could perfectly well function in a transparency mode, that is to say, without the reflector 8. The contrast would simply be a little less, as the light would then be subjected to only a single absorption effect, in the polarizer 7, on passing through the regions in which one or other or both liquid crystal layers are energized.

Likewise, the control electrodes could be disposed on the face 3a and/or on the face 3b of the plate 3, with the counter-electrodes then being disposed on the faces 2a and/or 4a of the plates 2 and 4. Irrespective of the plates which carry them, the counter-electrodes could be subdivided into partial counter-electrodes, so as to permit multiplexing of the cell.

While there is shown and described above one preferred illustrative embodiment of the invention, it will be understood by those skilled in the art that other modifications may be made within the principles of the invention and scope of the appended claims.

I claim:

1. A liquid crystal display device comprising, in sequence, a first polarizer, having a first direction of polarization, a first of three transparent insulating plates, a first nematic liquid crystal layer, the second plate, a second nematic liquid crystal layer, the third plate and a second polarizer having a second direction of polarization, said plates and said polarizers being substantially parallel and disposed in a facing relationship to each other, control electrodes disposed on said plates, and means for orienting the molecules of the first liquid crystal layer in contact with the first and the second plate in a first and a second direction of orientation respectively, and the molecules of the second liquid crystal layer in contact with the second and the third plate in a third and a fourth direction of orientation respectively, wherein said first direction of orientation is substantially parallel to said first direction of polarization, said first and second directions of orientation form an angle of substantially 60°, said third direction of orientation is substantially parallel to said second direction of orientation, said third and fourth directions of orientation form an angle of substantially 60°, and said second direction of polarization is substantially parallel to said fourth direction of orientation.

2. A liquid crystal display device comprising in sequence, a first polarizer, having a first direction of polarization, a first of three transparent insulating plates, a first nematic liquid crystal layer, the second plate, a second nematic liquid crystal layer, the third plate, a second polarizer having a second direction of polarization and reflector means adjacent the outside face of said second polarizer, said plates and said polarizers being substantially parallel and disposed in a facing relationship to each other, control electrodes disposed on said plates, and means for orienting the molecules of the first liquid crystal layer in contact with the first and the second plate in a first and a second direction of orientation respectively, and the molecules of the second liquid crystal layer in contact with the second and the third plate in a third and a fourth direction of orientation respectively, wherein said first direction of orientation is substantially parallel to said first direction of polarization, said first and second directions of orientation form an angle of substantially 60°, said third direction of orientation is substantially parallel to said second direction of orientation, said third and fourth directions of orientation form an angle of substantially 60°, and said second direction of polarization is substantially parallel to said fourth direction of orientation.

* * * * *